(12) United States Patent
Weiland

(10) Patent No.: US 12,153,505 B2
(45) Date of Patent: Nov. 26, 2024

(54) AUTOMATED SYSTEM FOR GENERATING PROPERLY TAGGED TRAINING DATA FOR AND VERIFYING THE EFFICACY OF ARTIFICIAL INTELLIGENCE ALGORITHMS

(71) Applicant: Kelley S. Weiland, Fredericksburg, VA (US)

(72) Inventor: Kelley S. Weiland, Fredericksburg, VA (US)

(73) Assignee: Weiland Innovations LLC, Fredericksburg, VA (US)

( * ) Notice: Subject to any disclaimer, the term of this patent is extended or adjusted under 35 U.S.C. 154(b) by 1065 days.

(21) Appl. No.: 16/948,683

(22) Filed: Sep. 29, 2020

(65) Prior Publication Data

US 2021/0097436 A1    Apr. 1, 2021

Related U.S. Application Data

(60) Provisional application No. 62/908,820, filed on Oct. 1, 2019.

(51) Int. Cl.
| | |
|---|---|
| G06F 11/30 | (2006.01) |
| G06F 11/36 | (2006.01) |
| G06F 18/21 | (2023.01) |
| G06N 20/00 | (2019.01) |

(Continued)

(52) U.S. Cl.
CPC ...... *G06F 11/3013* (2013.01); *G06F 11/3692* (2013.01); *G06F 18/217* (2023.01); *G06N 20/00* (2019.01); *G06V 10/774* (2022.01); *G06V 20/13* (2022.01)

(58) Field of Classification Search
CPC ............... G06F 11/3013; G06F 18/217; G06F 11/3692; G06F 18/251; G06N 20/00; G06N 3/045; G06N 20/20; G06V 10/774; G06V 20/13; G06V 10/443; G06V 20/582; G05B 2219/34416; G08G 1/166; B60Q 1/46; B60W 30/18163; G01S 17/931

See application file for complete search history.

(56) References Cited

U.S. PATENT DOCUMENTS

| | | |
|---|---|---|
| 6,256,352 B1 | 7/2001 | Chang |
| 7,085,637 B2 | 8/2006 | Breed et al. |
| 7,202,776 B2 | 4/2007 | Breed |

(Continued)

FOREIGN PATENT DOCUMENTS

| | | | | |
|---|---|---|---|---|
| CA | 3032812 A1 | * | 2/2018 | ............. G01C 21/32 |
| CN | 103946732 A | * | 7/2014 | ......... G02B 27/0093 |

(Continued)

*Primary Examiner* — Steven P Sax
(74) *Attorney, Agent, or Firm* — Hall Estill Law Firm

(57) ABSTRACT

The present invention comprises a novel method for generating AI training data sets and evaluating the efficacy of AI algorithms against real data. The invention consists of both hardware and software devices. The described hardware devices are capable of providing known test object metadata and state information such that the appropriate attributes of a test object may be known a priori for use in AI algorithms. The described software devices are capable of performing the temporal association of the sensor and test object metadata and either building the training data set or statistically evaluating the accuracy of a pre-existing AI algorithm.

21 Claims, 3 Drawing Sheets

(51) Int. Cl.
*G06V 10/774* (2022.01)
*G06V 20/13* (2022.01)

(56) References Cited

U.S. PATENT DOCUMENTS

| | | | |
|---|---|---|---|
| 7,295,925 | B2 | 11/2007 | Breed et al. |
| 7,418,346 | B2 | 8/2008 | Breed et al. |
| 7,629,899 | B2 | 12/2009 | Breed |
| 7,688,375 | B2 | 3/2010 | Ho |
| 7,770,847 | B1 * | 8/2010 | Severson ............... A63H 19/24 |
| | | | 246/5 |
| 9,103,671 | B1 | 8/2015 | Breed et al. |
| 10,627,396 | B2 * | 4/2020 | Bornhop .............. G01N 33/536 |
| 10,739,149 | B2 | 8/2020 | Chase et al. |
| 2012/0176237 | A1 * | 7/2012 | Tabe .................... A61B 5/6804 |
| | | | 340/539.12 |
| 2015/0326570 | A1 * | 11/2015 | Publicover ........... G06V 40/197 |
| | | | 382/117 |
| 2016/0127641 | A1 * | 5/2016 | Gove ..................... H04N 23/64 |
| | | | 348/143 |
| 2018/0204111 | A1 * | 7/2018 | Zadeh .................. G06V 10/764 |
| 2019/0141467 | A1 | 5/2019 | Breed |

FOREIGN PATENT DOCUMENTS

| | | | | |
|---|---|---|---|---|
| CN | 106600581 | A * | 4/2017 | |
| CN | 105083331 | B * | 5/2017 | |
| CN | 107077782 | A * | 8/2017 | ......... G06K 9/00785 |
| CN | 104208865 | B * | 6/2018 | ........... A61B 5/0002 |
| CN | 109843371 | A * | 6/2019 | ........... A61B 5/0488 |
| CN | 209085657 | U * | 7/2019 | ......... B62D 15/0215 |
| CN | 110568456 | A * | 12/2019 | ............ B61L 25/025 |
| CN | 110800273 | A * | 2/2020 | ................ G01D 5/00 |
| CN | 112074790 | A * | 12/2020 | ............ B60W 30/16 |
| CN | 112183712 | A * | 1/2021 | ................ G06F 8/41 |
| CN | 112183735 | A * | 1/2021 | ........... G06K 9/6289 |
| TW | 200919210 | A * | 5/2009 | |

* cited by examiner

AUTOMATED SYSTEM FOR GENERATING PROPERLY TAGGED TRAINING DATA FOR AND VERIFYING THE EFFICACY OF ARTIFICIAL INTELLIGENCE ALGORITHMS

RELATED APPLICATION

The present application claims priority to U.S. Provisional Patent Application No. 62/908,820 filed Oct. 1, 2019, the contents of which is hereby incorporated by reference.

BRIEF SUMMARY

The present invention overcomes the limitations in the status quo by utilizing both distributed hardware and software nodes to automate the building of training set data or verifying an AI algorithm has properly annotated the desired subject in the data.

Specifically, hardware consisting of A) a positioning system, such as a Global Positioning System (GPS) receiver or some other relative positioning system for cases where GPS signals cannot be received (such as Ultrawide Band sensors used indoors), B) a data storage method such as a SD or microSD card with the test subject's time-tagged metadata (and other test data as needed) written on the data storage device, and C) a transmitter (such as radio, Bluetooth, Ethernet, or some other method) for broadcasting this metadata to a receiving unit. The hardware node is co-located with the test subject(s).

Specifically, software capable of receiving the time-tagged data (both hardware node and sensor) for aggregation, storage, and subsequent analysis. The software receives the time-tagged data from the external sensor, such as a video camera in an Unmanned Aerial Vehicle, and the data broadcast from the hardware node. Keeping with the Unmanned Aerial Vehicle example, the software then associates the known subject position in every video frame with the known metadata. Since the subject position is known (as it is broadcast from the hardware nodes), the software can draw a proper bounding box around the subject and digitally associate the known metadata in every video frame. This process occurs at the rate of input sensor data and input hardware node data.

The same system can work in reverse, i.e. the system can be used to verify an AI algorithm is properly classifying the sensor data by comparing the known subject metadata against the AI algorithm output.

In the case where verification of the subject's identity is necessary, for example, in dense target environments where subjects are positioned with separation distances close to or less than the error in geolocation, a positive target feedback can be employed. An example of positive feedback is the subject encoding a message and transmitting this information over the broadcast mechanism.

The same system can be utilized for multiple sensors whose aggregation constitutes a single or network of discrete lines or geo-boundary polynomials. In this way, a boundary or area may be defined and/or identified.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

Figure 1:
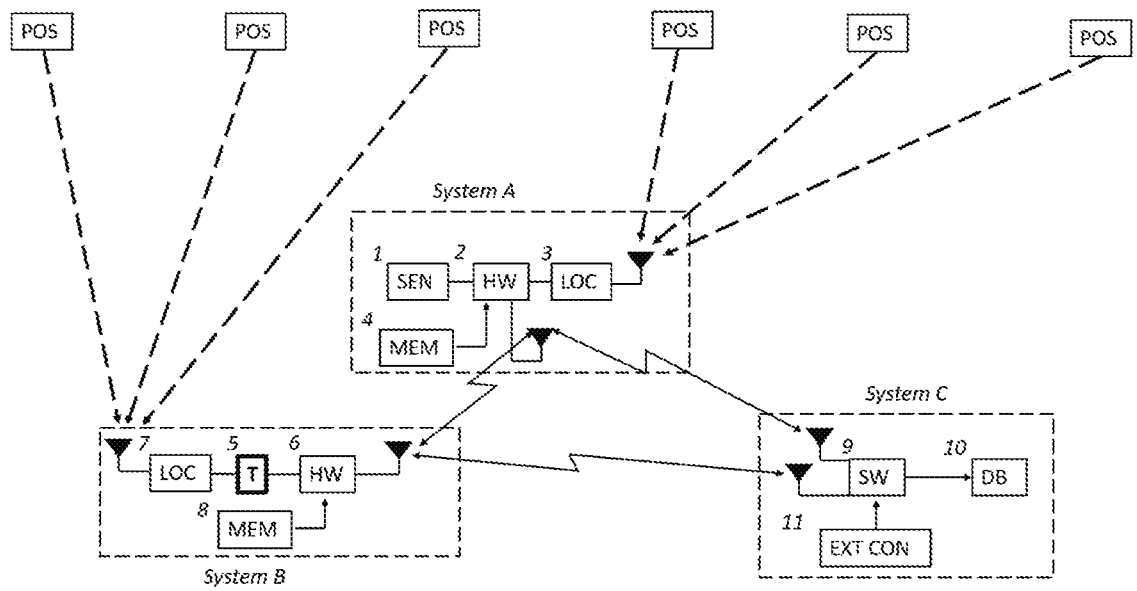
FIG. 1 displays a generalized architecture of the invention.

The present invention automates common procedures required during the development and analysis of Artificial Intelligence (AI) algorithms.

Specifically, the invention automates two crucial steps: the generation of properly tagged training data sets and the verification/validation of AI algorithm performance.

The invention relates to both hardware devices and software algorithms that build automated training data sets and evaluate AI algorithms for efficacy.

Artificial Intelligence (AI) is a rapidly growing field that has permeated into many areas of both civilian and military technology. In general, AI algorithms "learn" via statistical pattern recognition by "training" against known data sets.

AI algorithms perceive information from a sensor, such as numerical data (for example radio wave signals collected by an antenna, which could be used for geolocating radio emitter positions), video (for example video imagery from an Unmanned Aerial Vehicle), or any number of other methods. In all cases, the sensor feeds data into the AI algorithm and the AI algorithm must accuracy classify the signal context. Typically, a specific test signal or object must be extracted from data in order to be deemed a successful algorithm.

Some types of AI algorithms require large amounts of properly formatted training data sets in order to accurately classify incident signals, be it numerical, video, or some other type. These data sets contain a digital association of metadata that defines the state of the subject data a priori. By digitally associating this metadata with every training data set, an AI algorithm can "learn" how to classify information. The type of training data can be purely numerical (such as geolocating radio emitter positions), pictorial (such as video imagery from an Unmanned Aerial Vehicle, or any number of other methods.

An example of the problem in modern AI development occurs in many types of automated recognition of subjects from imagery. In order to build the training data set, a researcher must first train the AI algorithm by manually drawing a bounding box around the desired object (a tree, cat, truck, etc.) and then manually indicate the test object with associated metadata (a red truck with chrome wheels, for example). This occurs for every image frame that will be used for training AI algorithms, which can be quite large and time consuming. The aforementioned example is the status quo in building AI training data sets and imposes large time and money costs on the development cycle.

In order to circumvent the enormous costs of training against actual data, many researchers build their own training data sets using synthetic data. However, given that the AI algorithm will be expected to perform against real world data, training data sets composed of real-world data are preferred.

Even if the training data set is manually generated and used to build the AI algorithm, the automated analysis of algorithm efficacy is manually completed. A human must manually verify the results of the AI output with a large amount of new data against which the algorithm is expected to perform adequately. The AI algorithm must then be scored for accuracy. This is a time-consuming process and imposes large time and money costs on the development cycle but is crucial for building trust between humans and AI algorithms.

Therefore, a need exists to A) automate both the collection, injection of metadata, and building of training data sets and B) automate the analysis and scoring of AI algorithms during test.

A new method for automating procedures required by AI algorithms is are discussed herein. Specifically, the invention relates to procedures for generating and assessing data required or generated by AI algorithms without manual human intervention.

The present invention will be described by referencing the appended figures representing preferred embodiments.

We make mention of the state of an object in this disclosure. Here state refers to the defining characteristics that make the object unique at a point in time.

FIG. 1 depicts a generalized architecture of the invention, denoting those elements required for implementation and is composed of three systems (A, B, and C) are shown. System A is the sensor system, and is composed of a sensing element 1 (imager, electromagnetic antenna, etc.), a controller 2 (usually a microcontroller or microprocessor based system) capable of uni- or bi-directional communication (via radio, LAN network, etc.) to outside systems, and a positioning device 3 capable of receiving absolute or relative positioning coordinates from positioning system 12 (Global Positioning System, Ultrawide Band indoor positioning systems, etc.). The controller 2 is capable both reporting the state of System A and accepting commands (if required).

FIG. 1 System B is a target system co-located with the target item 5 (a physical object, such as a boat or car, but could also be a signal emitter such as a radar or a computer on a LAN network, etc.). For reference, the target item 5 is also sometimes referred to as the target, the target object, the test object, or the test subject. A hardware package 6 accepts real-time location data 7 of the target item 5, as well as metadata specific to the target item 5 from an on-board source of memory 8 (a SD card, non-volatile memory, etc.). In this manner elements 6, 7, and 8 permit a time-tagged association of metadata with the target item 5. The association of this metadata with the target item 5 is a crucial aspect of the present invention.

FIG. 1 System C is a base station that receives time-tagged sensor and state information of both System A and System B. Namely, System A transmits sensor 1 data as it is being recorded and real-time location 3 of the sensor via controller 2. System C also receives time-tagged location 7 and metadata 8 from System B that defines the state of target item 5. Software 9 receives this data over any number of communication protocol (radio, LAN network, etc.) and packages the data from both System B and System A for either building training data sets or evaluating an AI algorithm. The packaged data can be sent to a database 10 or other general storage device. An external controller 11 is also capable of monitoring the event in its entirety; commands may be issued from external controller 11 to control sensor 1 or target item 5 behaviors or any other number of real-time attributes.

FIG. 1 System A controller 2 is important especially while building training data sets. Controller 2 provides a mechanism such that System B or C can command the sensor 1 to observe the test item 5 located in System B. Otherwise, the sensor 1 may not record the appropriate signal generated by target item 5, which is used in building the training data sets.

Figure 2:
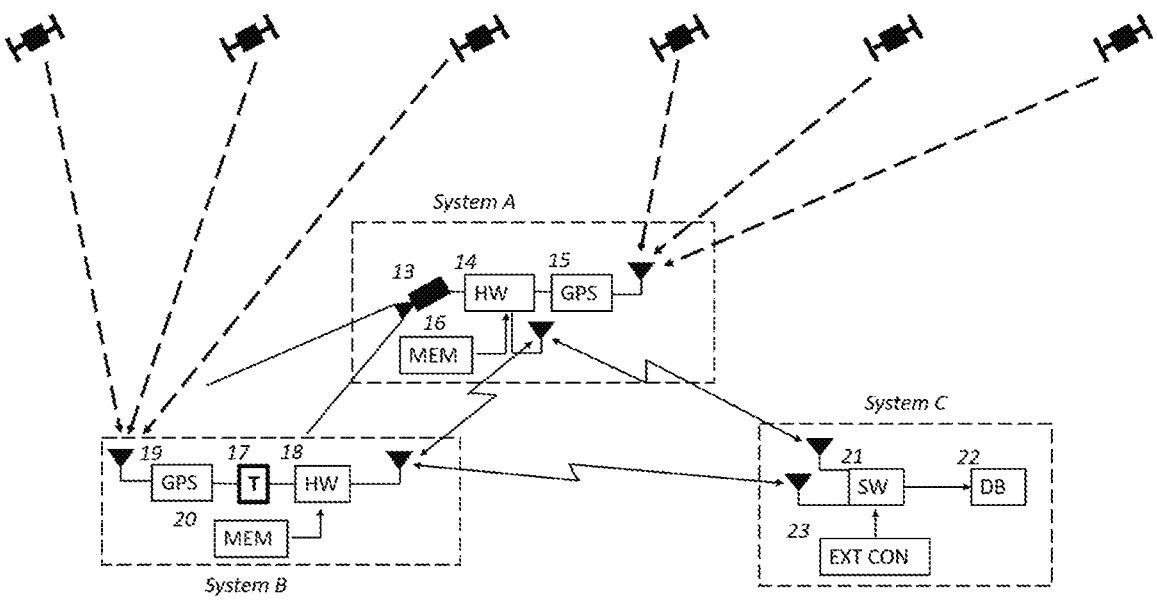
FIG. 2 displays an example implementation of the invention using a video camera as the sensor.

A specific example of the present invention is shown in FIG. 2. Here the sensor 13 is the camera on an Unmanned Aerial Vehicle (UAV) orbiting and recording video imagery of an automobile 17. Position data for System A and System B is given by the Global Positioning System 24 (GPS) and is processed by GPS receivers 15 and 19.

The test item 17 position 19 and metadata 20 are passed to a hardware device 18 capable of transmitting all state information of the test item 17 to the receiver 23 located on System C. The video sensor state, position 15, and recorded data is passed through controller 14 to System C software 21 for processing and storage 21.

The present invention permits the test item 17 to cue the sensor 13 such that the sensor 13 readily and continuously records the test item 17 for a long period of time. In the case of FIG. 2, this could occur by hardware package 18 transmitting the test item 17 position 19 via radio relay to the controller 14 co-located with the sensor 13. In the present example, the controller 14 located on the UAV can command the video sensor 13 to point directly at the test item 17.

Figure 3:
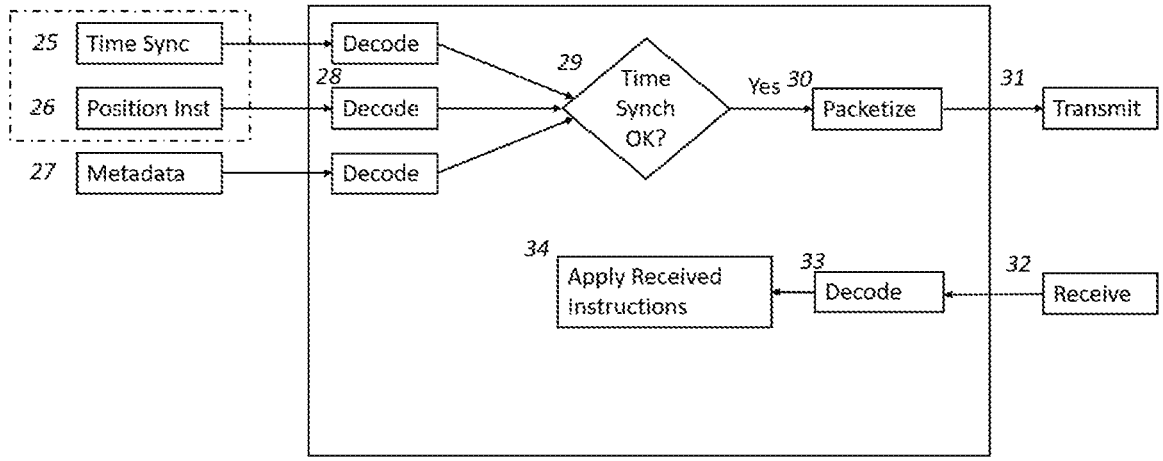
FIG. 3 displays an example implementation of the hardware portion of this invention.

FIG. 3 is an example implementation of the hardware 6 denoted in FIG. 1 for recording and transmitting test item 5 state information and metadata. Specifically, time synchronization 25 and position instrumentation 26 arrive at the hardware and are decoded 28 into a processable form of data. Metadata 27 stored on-board in memory is also decoded if necessary. The two data streams 26 and 27 are checked for proper time synchronization 29 and, if successful, and packetized into a frame capable of transmission (LAN network, radio, etc.). The hardware 6 is also capable of receiving instructions 32 which when decoded 33 may or may not change test item 5 state via an instruction set 34.

Figure 4:
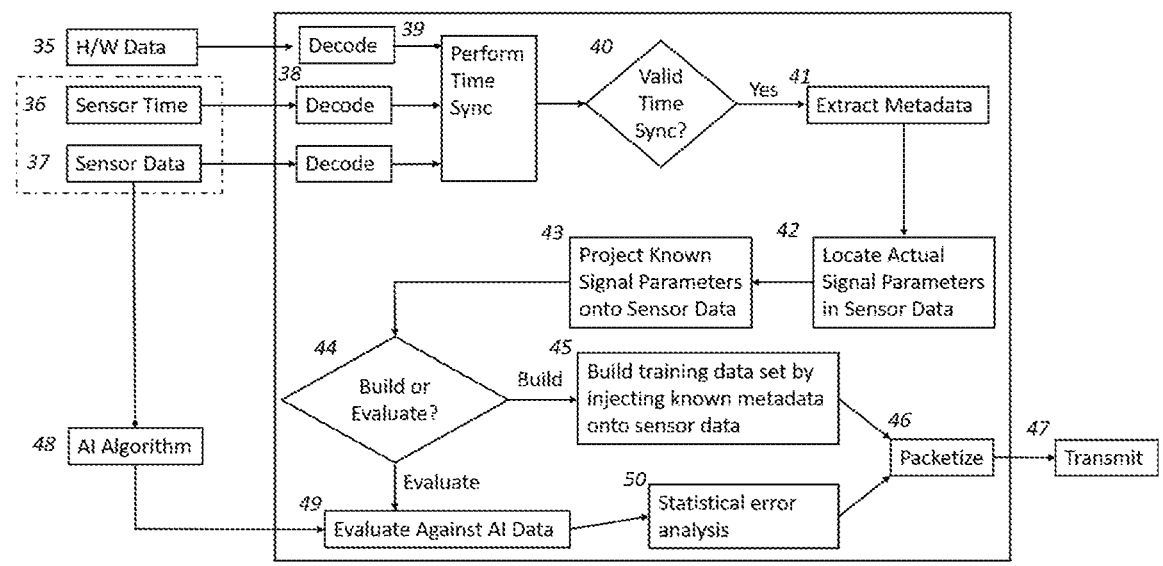
FIG. 4 displays an example implementation of the software portion of this invention.
Figure 5:
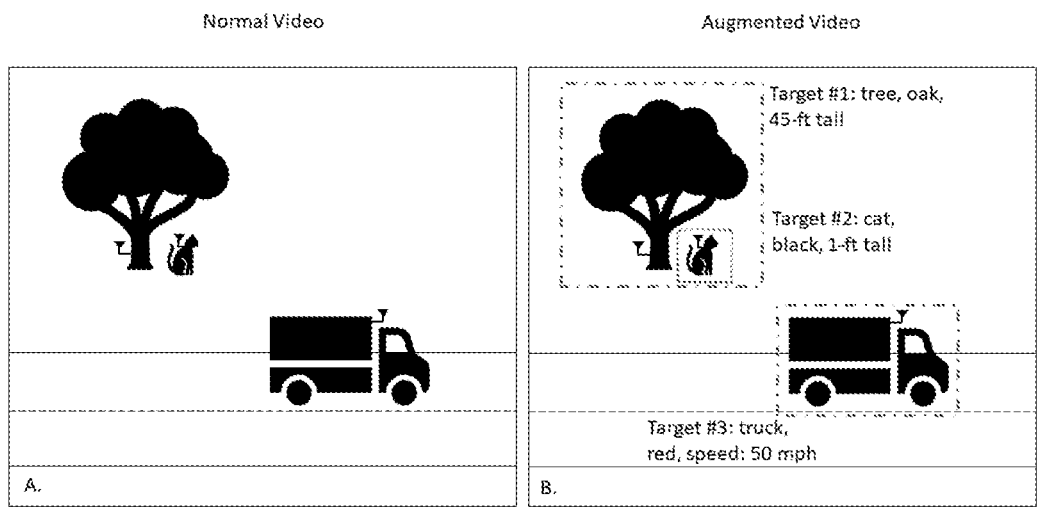
FIG. 5 displays an example of normal video and augmented video with three properly tagged targets.

FIG. 4 is an example implementation of the software 21 denoted in FIG. 1 for receiving both sensor 1 and test item 5 data. Specifically, hardware data 35, sensor time 36, and sensor data 37 are ingested and decoded 38 (if necessary, it is usual that the hardware 35 will transmit its data in a form readily ingested) and checked for proper time synchronization 39. If a valid time synchronization 40 exists, the test item 5 metadata 8 is extracted 41 and located in the actual sensor 1 data stream 42. The known test item 5 metadata is then applied against the real sensor 1 data 43. An example of this process as given in FIG. 2 and FIG. 5 is the recording of a moving truck as the test item 17, identified as Target #3. As the controller 14 knows the position of the test item 17, controller 14 can point the UAV camera directly at the geographic coordinates of test item 17. A mapping of pixel to geodetic coordinates permits the test item 17 metadata to be denoted in the live video imagery pixels; in the present example this would constitute a box to be drawn about the test item 17, as shown in FIG. 5B.

FIG. 4 then bifurcates the process based on whether the goal is to build training data sets or evaluate AI algorithm efficacy.

If the goal is to build training data sets, the known metadata 8 of the test item 5 is digitally associated 45 with the sensor 1 data stream. The raw sensor data 1 and associated metadata are packetized 43 for transmission 44 using a communication protocol (LAN network, radio, etc.) to a storage device.

If the goal is to evaluate an existing AI algorithm, the AI algorithm data 45 is evaluated against the known recorded data 40 and a statistical error analysis may be performed 47. The results of this analysis are then packetized 46 and transmitted 47 using a communication protocol (LAN network, radio, etc.) to a storage device.

FIG. 5 shows an example video image (frame) with three target objects within a field of view. FIG. 5A shows the normal video. FIG. 5B shows an example implementation of an augmented video with the three target objects each properly tagged, each object has a bounding box and is digitally associated with the known metadata.

In some instantiations, it may prove necessary to have positive feedback of the subject. This would occur, for example, in dense target environments where subjects are positioned with separation distances close to or less than the error in geolocation. In this case, the system may improperly tag the wrong subject. An example of positive feedback is the subject encoding a message and transmitting this information over the broadcast mechanism. In the example of a UAV observing a target object, the target object could flash a light such that the UAV would observe this event, confirm the correct target object is being tracked, and maintain a positive lock on the desired test subject using traditional computer vision tracking methods.

The same system can be utilized for multiple sensors whose aggregation constitutes a single or network of discrete lines or geo-boundary polynomials. In this way, a boundary or area may be defined and/or identified. In the example of a UAV, the UAV could continuously monitor a restricted area or geo-boundary defined by sensors located on four stationary or moving objects, such as buoys or vessels, and begin tracking a target object once the target enters the restricted area.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A system comprising:
    a target system co-located with a test object, the target system configured to acquire and store a first state information that describes a state of the test object, the first state information comprising time-tagged target position data indicative of a real-time location of the test object;
    a sensor system located remotely to the target system and comprising onboard instrumentation and a sensor, the sensor system configured to acquire sensor data associated with the test object and a second state information that describes a state of the sensor system, the sensor data comprising time-tagged image data of the test object within a field of view generated using a controller based target tracking system configured to nominally maintain the test object within the field of view, the second state information comprising time-tagged sensor position data indicative of a real-time location of the sensor; and
    a base station connected to the target system and the sensor system, the base station configured to receive the first state information, the second state information, and the sensor data to:
        perform a time-synchronization check between the first state information, the second state information, and the sensor data;
        provide feedback data comprising the real-time location of the test object from the first state information to the sensor system, wherein the controller based target tracking system further adjusts the relative orientation of the sensor responsive to the feedback data to maintain the test object within the field of view;
        bundle the first state information, the second information and the sensor data in a training data set; and
        save the training data set in a data storage device;
    wherein the time-tagged image data comprise a succession of image frames each having an associated field of view in which the test object is maintained by a controller of the sensor system responsive to the time-tagged target position data which is transmitted, to the sensor system, by at least a selected one of the target system or the base station;
    wherein the base station is further configured to process the first state information, the second state information, and the sensor data to associate the real-time location of the test object from the first state information with each of a succession of frames in the sensor data; and
    wherein at least a selected one of the target system or the sensor system is on a moveable vehicle.

2. The system of claim 1, wherein the first state information is determined by a positioning system of the target system configured to determine the real-time location of the test object during movement thereof using an external positioning signal emitted from a global coordinate positioning system.

3. The system of claim 1, wherein the target system transmits pre-defined metadata that describes the target system to the base station to be included in the training data set.

4. The system of claim 1, wherein the target system is located on a moveable vehicle.

5. The system of claim 4, wherein the moveable vehicle is unmanned.

6. The system of claim 1, wherein the sensor is a video camera, and the sensor data is optical data detected by the video camera.

7. The system of claim 1, wherein the sensor is an antenna, and the sensor data is electromagnetic data transmitted from the target system and detected by the antenna.

8. The system of claim 1, wherein the base station is co-located with the sensor system.

9. The system of claim 1, wherein the sensor system is located on a moveable vehicle.

10. The system of claim 9, wherein the moveable vehicle is unmanned.

11. The system of claim 1, wherein a plurality of separate target systems and sensor systems are connected to the base station and the base station is configured to process state information from all of the connected separate target systems and sensor systems.

12. A method comprising:
    acquiring a first state information associated with a target system co-located with a test object, the first state information describing a state of the test object and comprising time-tagged target position data indicative of a real-time location of the test object;
    acquiring a second state information and sensor data associated with a sensor system operably coupled to track the target system from a location remote from the target system, the sensor system comprising onboard instrumentation and a sensor, the second state information comprising time-tagged sensor position data indicative of a real-time location of the sensor, the sensor data comprising time-tagged image data of the test object within a field of view, the sensor data generated using a controller based target tracking system of the onboard instrumentation configured to adjust a parameter of the sensor to nominally maintain the test object within the field of view;

receiving the sensor data, the first state information, and the second state information by a base station;

performing a time-synchronization check between the sensor data, the first state information, and the second state information with the base station;

transmitting the time-tagged target position data from the first state information to the sensor system;

using the transmitted time-tagged target position data as input feedback data to the controller based target tracking system of the sensor system to adjust a parameter of the sensor to further maintain the test object within a field of view of the sensor;

bundling the first state information and the second state information into a training data set with the base station; and saving the training data set in a data storage device wherein the time-tagged image data comprise a succession of image frames each having an associated field of view in which the test object is maintained by a controller of the sensor system responsive to the time-tagged target position data which is transmitted, to the sensor system, by at least a selected one of the target system or the base station;

wherein the base station is further configured to process the first state information, the second state information, and the sensor data to associate the real-time location of the test object from the first state information with each of a succession of frames in the sensor data; and wherein at least a selected one of the target system or the sensor system is on a moveable vehicle.

13. The method of claim 12, wherein the training data set is automatically generated by circuitry of the base station and is used by the base station to determine an efficacy of an artificial intelligence algorithm.

14. The method of claim 12, wherein the sensor data is optical data of the target system.

15. The method of claim 12, wherein the sensor data is electromagnetic data transmitted from the target system.

16. The method of claim 12, wherein the sensor system comprises means for providing positive target identification feedback to the sensor system.

17. The method of claim 12, wherein the base station processes state information from a plurality of separate target systems and from at least one sensor.

18. The method of claim 12, wherein the target system transmits pre-defined metadata about the target system to the base station, the base station including the pre-defined metadata into the training data set.

19. The system of claim 1, wherein the target system comprises bi-directional communication circuitry.

20. The system of claim 1, wherein the base station is further configured to automatically annotate, via a boundary box type tag, the target object in the sensor data responsive to the time-tagged target position data from the target system in the training data set.

21. The system of claim 1, wherein the base station is further configured to use the training data set as a training input to an AI-based target tracking system subsequently used to track targets similar to the test object using sensors similar to the sensor.

* * * * *